(12) United States Patent
Swanson et al.

(10) Patent No.: US 7,571,210 B2
(45) Date of Patent: Aug. 4, 2009

(54) METHODS AND SYSTEMS FOR LINKING VIRTUAL MEETING ATTENDEES OVER A NETWORK

(75) Inventors: Jon N. Swanson, Queensbury, NY (US); Jonathan D. Arnold, Medford, MA (US)

(73) Assignee: Insors Integrated Communications, Chicago, IL (US)

( * ) Notice: Subject to any disclaimer, the term of this patent is extended or adjusted under 35 U.S.C. 154(b) by 1058 days.

(21) Appl. No.: 10/727,471

(22) Filed: Dec. 4, 2003

(65) Prior Publication Data

US 2004/0111472 A1 Jun. 10, 2004

Related U.S. Application Data

(60) Provisional application No. 60/431,476, filed on Dec. 6, 2002, provisional application No. 60/431,600, filed on Dec. 6, 2002.

(51) Int. Cl.
  G06F 15/16 (2006.01)
  G06F 3/00 (2006.01)
(52) U.S. Cl. .................. 709/204; 715/751; 715/753
(58) Field of Classification Search .......... None
  See application file for complete search history.

(56) References Cited

U.S. PATENT DOCUMENTS

| | | | |
|---|---|---|---|
| 4,635,251 A | 1/1987 | Stanley et al. | |
| 4,796,293 A | 1/1989 | Blinken et al. | |
| 5,109,384 A | 4/1992 | Tseung | |
| 5,369,694 A | 11/1994 | Bales et al. | |
| 5,506,954 A * | 4/1996 | Arshi et al. | 345/501 |
| 5,508,732 A * | 4/1996 | Bottomley et al. | 725/93 |
| 5,680,392 A | 10/1997 | Semaan | |
| 5,758,079 A * | 5/1998 | Ludwig et al. | 709/204 |
| 5,838,914 A | 11/1998 | Carleton et al. | |
| 5,844,973 A | 12/1998 | Venkatraman et al. | |
| 5,867,156 A | 2/1999 | Beard et al. | |
| 5,870,547 A | 2/1999 | Pommier et al. | |
| 5,872,923 A | 2/1999 | Schwartz et al. | |
| 5,874,960 A | 2/1999 | Mairs et al. | |
| 5,889,946 A | 3/1999 | FitzPatrick et al. | |
| 5,903,629 A | 5/1999 | Campbell, IV et al. | |

(Continued)

OTHER PUBLICATIONS

Avayam, Inc. "Avaya Multipoint Conferencing Unit," Advanced Multipoint Conferencing for Collaborating in Powerful New Ways, 2002.

(Continued)

*Primary Examiner*—John B. Walsh
(74) *Attorney, Agent, or Firm*—Greer, Burns & Crain, Ltd.

(57) ABSTRACT

The present invention is directed to methods and computer program products for communicating real time data streams between a plurality of virtual meeting attendees over a digital data network. One exemplary method of the invention includes the steps of receiving a plurality of real time data streams from each of a plurality of virtual meeting attendees, of linking a first and a second of the real time data streams from each of the attendees to a first network interface, of linking only the first data stream from each of the attendees to a second network interface, and of linking only the second data stream from each of the attendees to a third network interface.

19 Claims, 6 Drawing Sheets

U.S. PATENT DOCUMENTS

| | | | |
|---|---|---|---|
| 5,915,908 | A | 6/1999 | Beutler |
| 5,923,844 | A | 7/1999 | Pommier et al. |
| 5,938,724 | A | 8/1999 | Pommier et al. |
| 5,944,785 | A | 8/1999 | Pommier et al. |
| 5,948,022 | A | 9/1999 | Carleton et al. |
| 5,948,056 | A | 9/1999 | Mizuno et al. |
| 5,949,975 | A | 9/1999 | Batty et al. |
| 5,991,385 | A * | 11/1999 | Dunn et al. ............ 379/202.01 |
| 5,995,096 | A | 11/1999 | Kitahara et al. |
| 6,025,871 | A | 2/2000 | Kantor et al. |
| 6,047,314 | A | 4/2000 | Pommier et al. |
| 6,078,948 | A | 6/2000 | Podgorny et al. |
| 6,115,027 | A | 9/2000 | Hao et al. |
| 6,151,020 | A | 11/2000 | Palmer et al. |
| 6,201,859 | B1 | 3/2001 | Memhard et al. |
| 6,204,847 | B1 | 3/2001 | Wright |
| 6,216,177 | B1 | 4/2001 | Mairs et al. |
| 6,253,167 | B1 | 6/2001 | Matsuda et al. |
| 6,268,855 | B1 | 7/2001 | Mairs et al. |
| 6,271,839 | B1 | 8/2001 | Mairs et al. |
| 6,282,206 | B1 * | 8/2001 | Hindus et al. ............... 370/468 |
| 6,285,363 | B1 | 9/2001 | Mairs et al. |
| 6,292,166 | B1 | 9/2001 | Palmer et al. |
| 6,329,984 | B1 | 12/2001 | Boss et al. |
| 6,418,214 | B1 | 7/2002 | Smythe et al. |
| 6,421,047 | B1 | 7/2002 | de Groot |
| 6,442,758 | B1 | 8/2002 | Jang et al. |
| 6,636,888 | B1 | 10/2003 | Bookspan et al. |
| 6,677,979 | B1 | 1/2004 | Westfield ................. 348/14.12 |
| 6,760,749 | B1 * | 7/2004 | Dunlap et al. ............... 709/204 |
| 6,775,247 | B1 | 8/2004 | Shaffer et al. |
| 7,151,762 | B1 | 12/2006 | Ho et al. |
| 7,167,552 | B1 * | 1/2007 | Shaffer et al. .......... 379/202.01 |
| 7,193,996 | B2 | 3/2007 | Dobbins et al. |
| 7,215,647 | B2 | 5/2007 | Wilson |
| 7,225,459 | B2 | 5/2007 | Magliaro |
| 7,233,933 | B2 | 6/2007 | Horvitz et al. |
| 2001/0043571 | A1 * | 11/2001 | Jang et al. ................... 370/260 |
| 2002/0133473 | A1 * | 9/2002 | Grande et al. ............... 705/418 |
| 2004/0111472 | A1 | 6/2004 | Swanson et al. |
| 2004/0117446 | A1 | 6/2004 | Swanson |
| 2004/0236593 | A1 | 11/2004 | Swanson |
| 2004/0249967 | A1 | 12/2004 | Swanson |
| 2005/0232151 | A1 | 10/2005 | Chapweske et al. |
| 2005/0237377 | A1 | 10/2005 | Chapweske et al. |

OTHER PUBLICATIONS

Polycom, "Guide to Conferencing and Collaboration", (2003), p. 2-9.
Intercall, "MeetingCenter", www.intercall.com (believed published circa 2003).
Tanberg, Tanberg Scheduler: Videoconference Scheduling and Room Reservation, www.tanberg.net (Jul 2002).
Latitude Communications Inc., "Meeting Place Web 4.0", www.meetingplace.net (2003).
Jennifer Teig von Hoffman, "How to Start up an Access Grid Node Using Virtual Venues", (2001), p. 1-12.
Access Grid, "The Access Grid Project", www.accessgrid.org (believed published circa 2001).
Jennifer Teig von Hoffman, "Beginner's Guide to Facilitating Interactive Communications on the Access Grid," (2002), p. 1-18.
Jennifer Teig von Hoffman,"Guide to Distributed PowerPoint", (2001), p. 1-14.
RADVision, "IP Centric Conferencing", (2001) p. 1-14.
Wainhouse Research, "Will Your Next Video Bridge Be Software-Based?" Examining a Next-Generation Software-Based Video Conference Server, (2003) p. 1-10.
ClearOne, "A Guide to Multipoint Conferencing", (2002) p. 1-24.
Sonexis, "Evaluating Conferencing Solutions", A Buyer's Guide, p. 1-22.
Sprint, "How Businesses Can Get the Most Out of Conferencing and Collaboration Tools", (2002) p. 1-14.
Timothy M. O'Neil, Polycom, Inc., "Demystifying IP Migration for IT Professionals", (2003) p. 1-15.
Ian Foster et al. "A Distributed Resource Management Architecture that Supports Advance Reservations and Co-Allocation," published on the World Wide Web at http://www/globus.org/alliance/publications/papers/iwqos.pdf#search=%22a%20distributed%20resource%20management%20architecture%22 (1999).
Warren Smith, Ian Foster, Valerie Taylor, "Scheduling with Advanced Reservations," International Parallel and Distributed Processing Symposium (IPDPS '00), (May, 2000).

* cited by examiner

FIG. 6

METHODS AND SYSTEMS FOR LINKING VIRTUAL MEETING ATTENDEES OVER A NETWORK

CROSS REFERENCE

The present application claims priority under 35 U.S.C. §119 of U.S. Provisional Patent Application Nos. 60/431,476 and 60/431,600 both of which were filed on Dec. 6, 2002.

FIELD OF THE INVENTION

The present invention is related to methods and systems for communicating data over a network between users, such as between attendees of a virtual meeting.

BACKGROUND OF THE INVENTION

Many methods are known for communicating data over a network, including for communicating digital data between remote computers. One exemplary application of such methods is multi-user collaboration in which multiple users share video, audio, and/or other data with one another. For example, virtual meetings may be conducted across a data network in which users see and hear one another in substantially real time and also share other data such as digital documents, presentations, pre-recorded video or audio, and the like. Generally, each of the users communicates a plurality of data streams that include real time video streams, real time audio streams, and real time data streams. These streams are then bundled with all of the other streams received from other meeting attendees and then communicated out to each of the participants so that all can see and hear all of the others.

Although such applications are known, problems with them remain unresolved. For example, it may be desired to conduct virtual meetings between multiple users over a data network, with some of the users having different connectivity resources and/or needs. Depending on the number of participants, the amount of bandwidth required may be quite substantial. All users may not have the required amount of bandwidth available. For users with a limited amount of bandwidth participation in the virtual meeting may be impossible or impractical.

Also, even if sufficient bandwidth is available to participate in the meeting, some users may not desire to devote all of the required bandwidth to the meeting. For example, in a virtual meeting that includes multiple speakers and data presentations, some users may only be interested in one particular video view (e.g., one particular speaker). Consuming all of the bandwidth required to receive the entire virtual meeting feed for these users is impractical and inefficient.

The scale and number of virtual meetings exacerbates these and other problems. As more and more attendees are present, managing the various data streams and communications becomes more and more daunting. Additionally, multiple virtual meetings may be occurring simultaneously, and therefore need to be managed concurrently with one another. This adds further complexity.

Unresolved needs in the art therefore remain.

SUMMARY OF THE INVENTION

The present invention is directed to methods and computer program products for communicating real time data streams between a plurality of virtual meeting attendees over a digital data network. One exemplary method of the invention includes the steps of receiving a plurality of real time data streams from each of a plurality of virtual meeting attendees, of linking a first of the plurality of data streams from each of the attendees to a first network interface, and of linking a second data stream from each of the attendees to a second network interface. A step of allowing a requestor to selectively link to the first and/or second network interface is also included.

Another exemplary embodiment of the invention is a method for linking data communications between a plurality of users in a virtual meeting on a data network. It includes steps of designating a first network interface for communicating real time video data streams, designating a second network interface for communicating real time audio data streams, querying the plurality of users to determine what types of real time data streams each will communicate to and from the network, and linking each individual user to one or both of the first and second network interfaces depending on what types of data said each selected.

DETAILED DESCRIPTION

Embodiments of the present invention are directed to methods and computer program products for communicating real time data streams between a plurality of virtual meeting attendees over a digital data network. It will be appreciated that program products of the invention may embody methods, and that methods of the invention may be practiced by a computer. A program product of the invention, for example, may be embodied in computer executable instructions stored on a computer readable memory that when executed cause one or more computers to perform steps of a method of the invention. Accordingly, it will be understood that description herein of a method embodiment of the invention may likewise apply to a computer program product, and likewise that description of a program product may apply to a method.

Exemplary methods and program products of the invention may find particular utility when practiced in association with a virtual meeting. As used herein, the term "virtual meeting" is intended to be broadly interpreted as an event in which real time communications occur between meeting attendees that are not physically present with one another. By way of particular example, a virtual meeting can be an audio/video conference conducted between users remote from one another over a digital data network. Also, as used herein the term "real-time" is intended to be broadly interpreted as meaning substantially instantaneous. For example, telephone communications over a PSTN may be considered to be "real-time" in that when a telephone user speaks his voice data is received at a far end of the PSTN at substantially the same time it is transmitted (although some small delay occurs).

Figure 1:
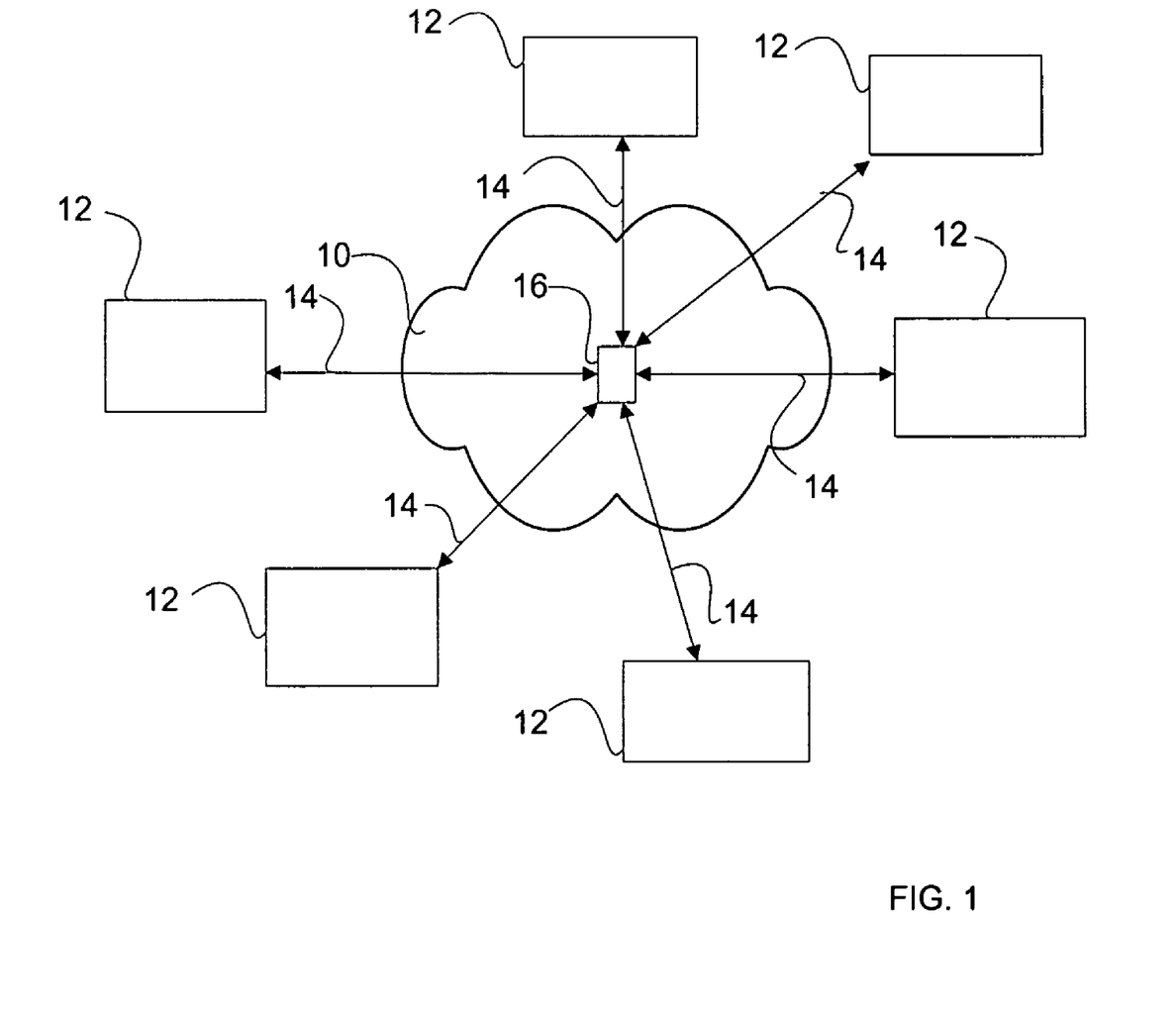
FIG. 1 is a schematic of a data network that is useful to describe an exemplary embodiment of the invention.
Figure 2:
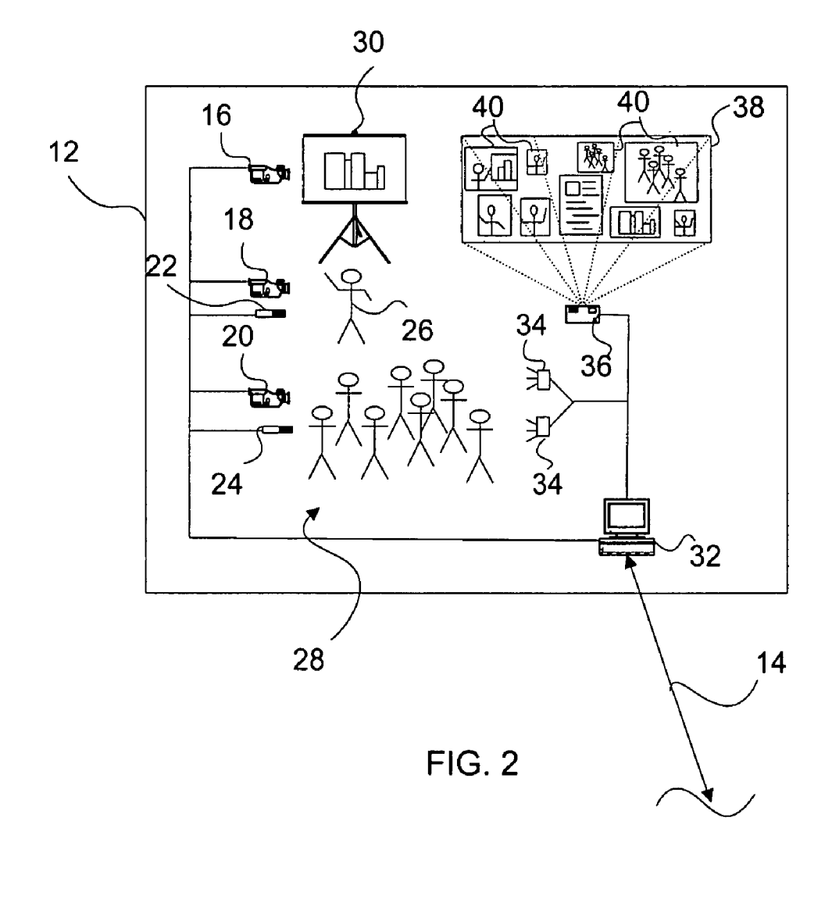
FIG. 2 is a schematic of conference room 12 of FIG. 1.

FIGS. 1 and 2 are schematics of a network 10 and meeting conference rooms 12 that are useful to further describe an embodiment of the present invention. FIG. 1 shows a network 10 with a plurality of conference rooms 12 connected thereto.

The conference rooms 12 may be considered to be meeting "users" or "attendees" for convenience. The network 10 may be any suitable interconnection for communicating data between the conference rooms 12, with examples including a digital data network, the PSTN, a wireless network, and the like. A preferred network 10 for practicing the invention includes a digital network configured for carrying packet-based data, such as an internet protocol network. These networks are believed to show great promise for carrying real-time video conferences with a high quality of service, at a reasonable cost, and in a highly immersive environment that is rich in data sharing.

The conference rooms 12 are remote from one another, and may, for example, be different rooms in the same building, or be rooms at different buildings. They may be in different states or countries from one another. Each of the conference rooms 12 are connected by a communications connection 14 to an interface 16 connected to the network 10. The communications connection 14 may be a wire, a wireless connection, or other like linkage suitable for carrying communications such as packet-based digital data. The term "interface" as used herein is intended to be broadly interpreted as meaning one or more links useful to electronically connect different users to one another. An interface may be hardware and/or software. It may be, for example, a bridge, a network card, a computer server or router, a software switch, one or more ports, or the like. In one exemplary invention embodiment, the interface is a port, while in another it is a group of ports.

FIG. 2 is a schematic illustration of a typical conference room 12. It generally includes a plurality of cameras 16, 18 and 20, and a plurality of microphones 22 and 24. The cameras 16, 18 and 20 and the microphones 22 and 24 may be trained on a speaker 26, an audience 28 and a data presentation 30. The cameras 16, 18, 20 and microphones 22 and 24 are linked to a computer 32 which may include a coder module for encoding the signals of cameras 16, 18 and 20 and the microphones 22 and 24. The computer 32 is also useful for communicating the signals to the network 10 over the linkage 14.

The computer 32 also receives communications from the network 10. The received communications can include real time video and audio data streams from the other conference rooms 12, as well as other data such as application data, replayed video, graphics and the like. The computer 32 may include a decoder for decoding received signals. The audio streams may be played over the speakers 34, and video streams sent to one or more projectors 36 for displaying on a screen 38. The images 40 displayed on the screen 38 may include speakers, audiences, documents, recorded video, and the like received from other of the conference rooms 12.

Figure 3:
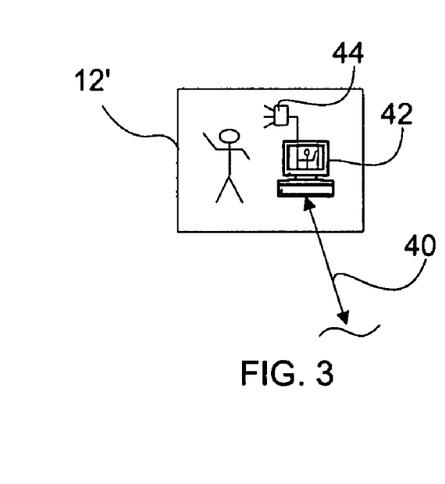
FIG. 3 is a schematic of an alternate conference room 12'.

It will be appreciated that the configuration of conference room 12 as illustrated in FIG. 2 is exemplary only, and that many other configurations are possible. Those skilled in the art will appreciate that the particular configuration may be established as will be useful for a particular application. More or fewer cameras and microphones could be present, for example. Also, the projector 32 and screen 36 could be replaced by one or more monitors. By way of particular example, FIG. 3 illustrates another possible configuration for a conference room that has been designated 12' for convenience. The conference room 12' may be representative of a traveling salesman or executive participating in a virtual meeting from a hotel room, home, or even from a mobile location (e.g., the room 12' could represent a mobile device). The conference room 12' includes a computer 42 linked to the network 10 by the communications connection 14. The computer 42 allows for real time video streams to be displayed, and a speaker 44 plays real time audio streams. No input is provided from the room 12' to the conference, it is used only for viewing and listening to participants at the other conference rooms 12. It will be appreciated, however, that a single camera and microphone could easily be added to the configuration of room 12'.

Figure 4A:
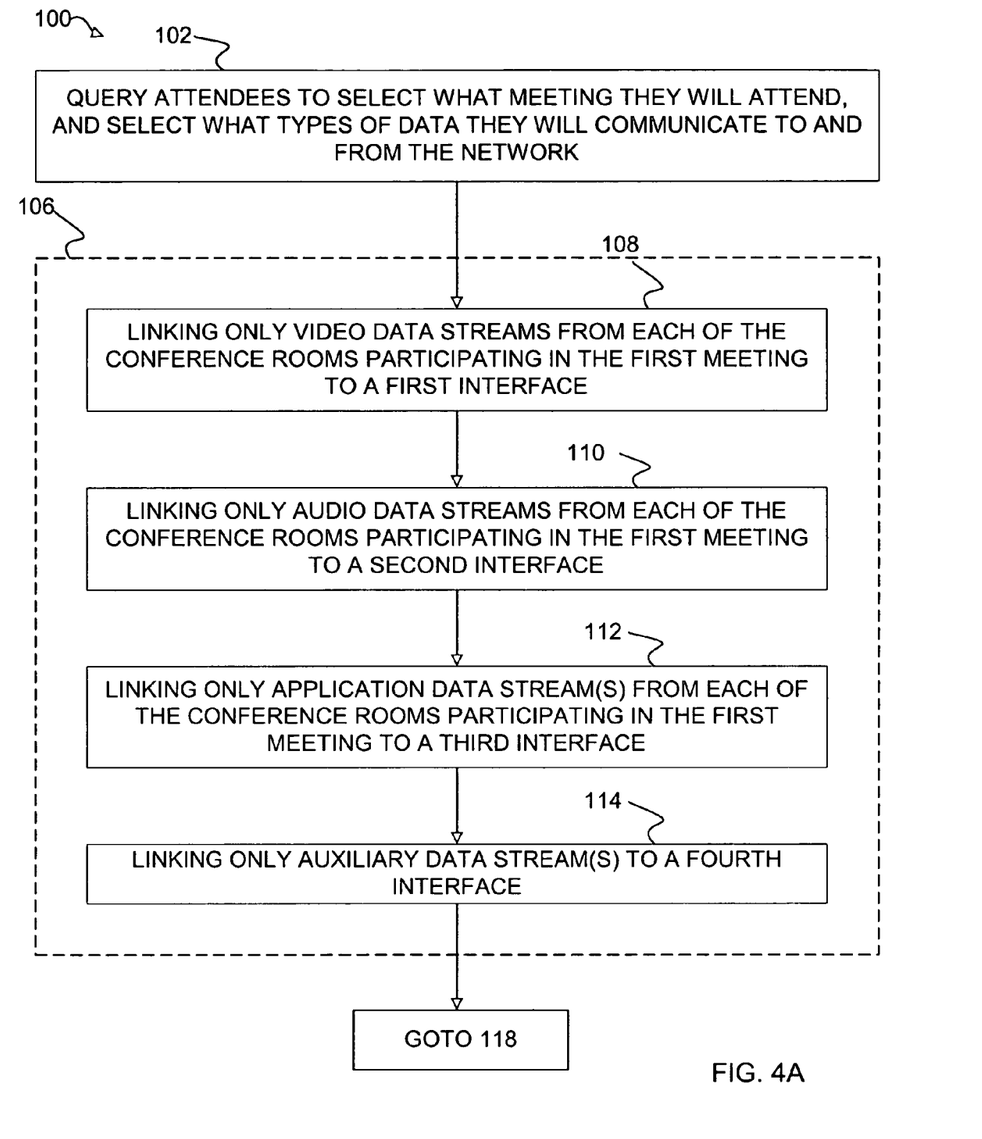
FIG. 4 is flowchart illustrating one exemplary embodiment of a method of the invention.
Figure 4B:
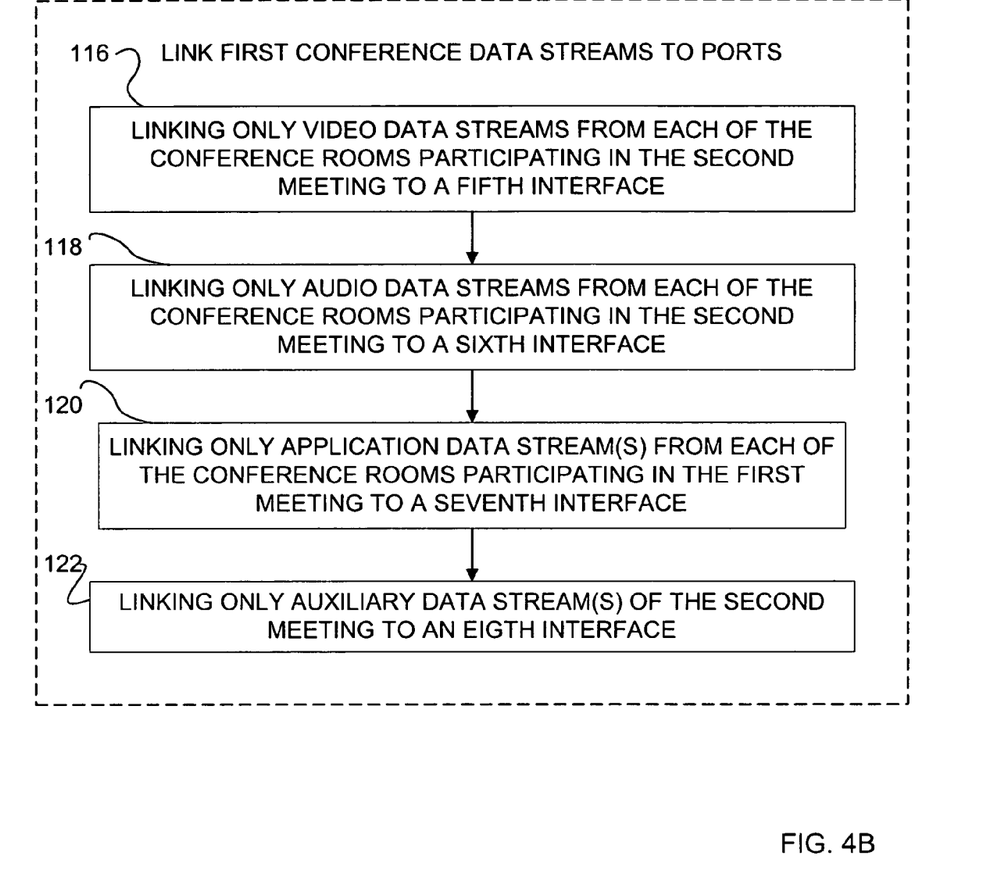

Having described an exemplary network and exemplary conference rooms useful for practice of the present invention, an exemplary method will now be illustrated. FIG. 4 is a flowchart of one exemplary method 100. The method 100 includes a step of allowing meeting attendees to selectively link to any of the interfaces (block 102). This can occur through an operator or other person at the meeting conference rooms 12 and 12' connecting to a virtual meeting interface and specifying what meeting they will be attending, and what data streams they wish to communicate to and from the meeting. For example, a meeting attendee may specify that he desires to communicate video and audio data to the meeting, and to receive video, audio, and application data.

As used herein, the term "application data" is intended to broadly refer to data from a software application. Examples of application data include, but are not limited to, documents such as MICROSOFT WORD, spreadsheets such MICROSOFT EXCEL, databases such as MICROSOFT ACCESS (MICROSOFT, WORD, EXCEL and ACCESS are registered trademarks of Microsoft Corporation, Redmond Wash.), pre-recorded video and/or audio, graphics programs, illustrations, and the like. Although some of these applications are sometimes unchanging data, within practice of the invention they are embodied in real time data streams. A Word document, for example, may be worked on collaboratively between multiple conference rooms with its current status streamed in real time from each conference room.

In the exemplary method 100, an additional data stream is contemplated. In particular, an "auxiliary" data stream may be communicated. As used herein, the "auxiliary" data stream is intended to be broadly interpreted as any one or more streams selected from the larger group of streams of a virtual meeting. An auxiliary data stream(s) may be selected on the basis of importance, subject matter, or other criteria. For example, in a large meeting there may be one video and audio stream devoted to a main speaker, and many additional video and audio streams dedicated to secondary speakers or audience members. In this case the video and data streams dedicated to the main speaker may be the auxiliary streams. Or, a virtual meeting may include discussion of a pre-recorded event or other stored data stream. This stored stream could be designated as the auxiliary stream.

The data streams are preferably packet-based, with internet protocol ("IP") format being an example. Each data packet may include header information that identifies a source and/or a destination by an identifier such as an IP address. One particular example of a suitable format is Real-Time Transport Protocol ("RTP"). RTP is known to be useful for communication of real time data streams over IP networks, including in association with video and audio data. Those skilled in the art will appreciate that RTP protocol generally encompasses communication of data in a discrete data portion and a discrete control portion.

Figure 5:
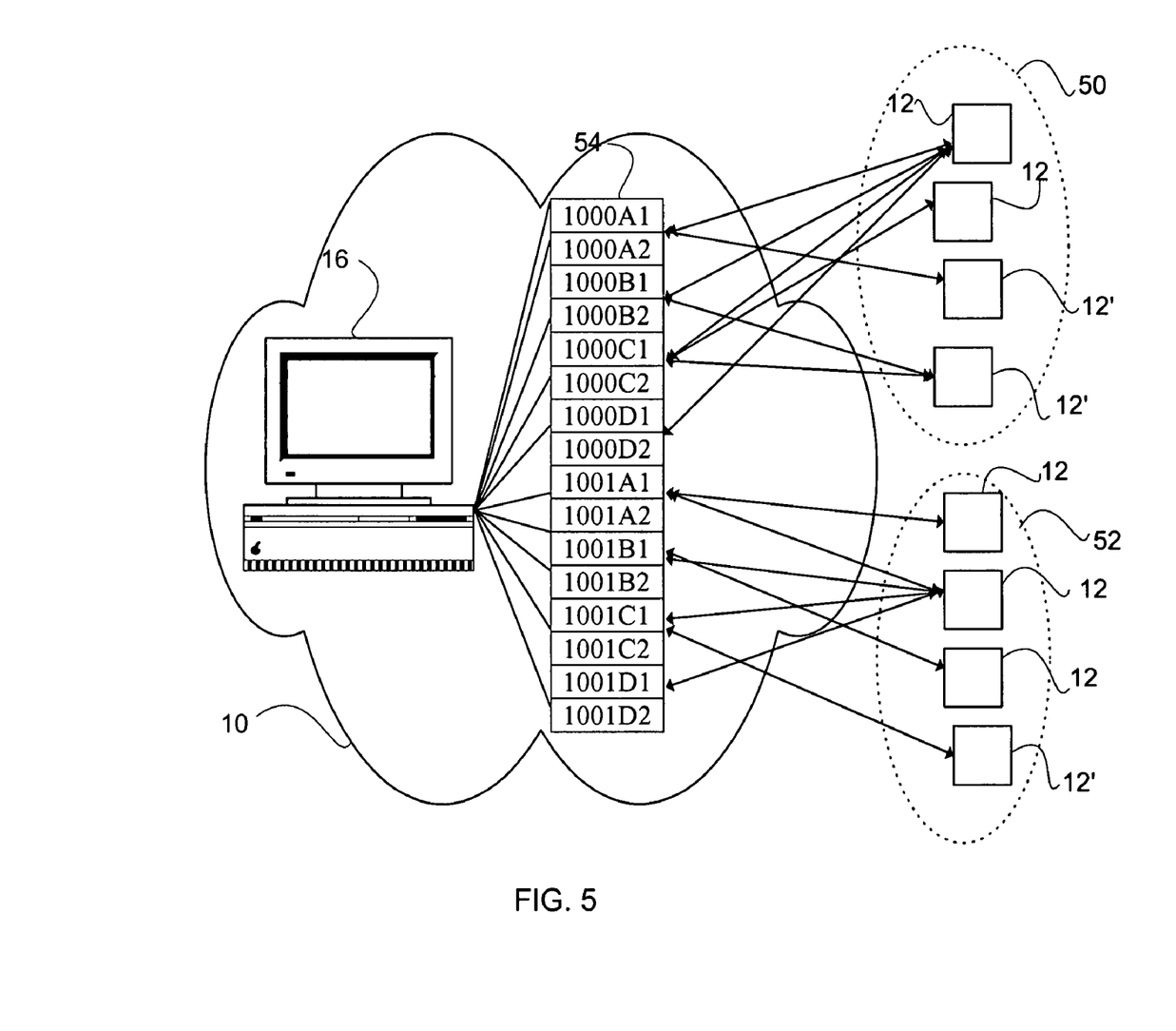
FIG. 5 is a schematic useful to illustrate the method of FIG. 4.

The real time data streams are received by an interface connected to the data network. The schematic of FIG. 5 is useful to further illustrate this step. The interface 16 has been illustrated as a computer containing a bridge 54. The computer 16 may include, for instance, a network card and have software running on it that creates the bridge 54. The bridge 54 may further include a plurality of individually addressable ports 1000A1-1001E2. Data streams are received from a plurality of conference rooms 12 that are participating in each of a first virtual meeting, represented by the dashed line circle 50, and a second virtual meeting represented by the dashed line circle 52. These two virtual meetings can be occurring at least partially concurrently with one another (e.g., there is at least some overlap between the duration of the two meetings).

When first and second meetings commence, a plurality of data streams are received from each of them. With reference to the schematic of FIG. 2, the real time data streams received from each conference room may include, for example, a plurality of real time video data streams, a plurality of real time audio data streams, and real time application data.

The exemplary method 100 proceeds to a series of steps of linking the various streams to individual interfaces. The dashed line box 106 illustrates these steps associated with the first virtual meeting. Only the video data streams from each of the conference rooms participating in the first virtual meeting are linked to a first interface (block 108). Only the audio streams are sent to a second interface (block 110), only the application data is sent to a third interface (block 112), and only the auxiliary data stream to a fourth interface (block 114). Similar steps are also carried out to link only the video data streams from the second meeting attendees to a fifth interface (block 116), only the audio data streams to a sixth interface (block 118), only application data to a seventh interface (block 120), and only the auxiliary data streams to an eighth interface (block 122). For example, if a conference room participating in the first meeting has indicated that it desires to receive application data only, it will be linked to the third interface.

The first through eighth interfaces may be, for example, ports of a software bridge that each has an individual network address. In the case of the preferred RTP protocol communications, the interfaces may be port pairs, with a first port being linked to the RTP stream data portion and the second port of the pair being linked to the RTP stream control portion. Also, the conference rooms are linked to interfaces as they have indicated to receive streams communicated from the network.

The steps of blocks 108-122 may be further understood by reference to FIG. 5, as well as Table 1 that describes the various ports and their content:

| Port No: | Description: |
| --- | --- |
| 1000A1 | Meeting 1: Video only; CONTROL |
| 1000A2 | Meeting 1: Video only; DATA |
| 1000B1 | Meeting 1: Audio only; CONTROL |
| 1000B2 | Meeting 1: Audio only; DATA |
| 1000C1 | Meeting 1: Application; CONTROL |
| 1000C2 | Meeting 1: Application; DATA |
| 1000D1 | Meeting 1: Auxiliary Stream; CONTROL |
| 1000D2 | Meeting 1: Auxiliary Stream; DATA |
| 1001A1 | Meeting 2: Video only; CONTROL |
| 1001A2 | Meeting 2: Video only; DATA |
| 1001B1 | Meeting 2: Audio only; CONTROL |
| 1001B2 | Meeting 2: Audio only; DATA |
| 1001C1 | Meeting 2: Application; CONTROL |
| 1001C2 | Meeting 2: Application; DATA |
| 1001D1 | Meeting 2: Auxiliary Stream; CONTROL |
| 1001D2 | Meeting 2: Auxiliary Stream; DATA |

In FIG. 5, the port pairs of TABLE 1 have been collectively represented as the bridge 54. It will be appreciated that the bridge 54 can be a software bridge that is created by program instructions being executed by the computer 16.

Thus the method 100 achieves important advantages and benefits. For example, through practice of the method 100, a meeting attendee is able to tailor his virtual meeting experience by choosing which portion of the data streams to send and receive. Thus if a mobile user with limited bandwidth and other resources such as the mobile user illustrated in the conference room 12' of FIG. 3 should choose to receive audio only, to receive video only, or to receive only audio and video, he may do so by specifying which interfaces to link to. It is contemplated, for instance, that a user could call into a virtual meeting over a phone and participate only by audio. Also, an attendee may be advised that his bandwidth is not sufficient to support communication of all data streams and be directed to one or more particular channels that can be supported.

Figure 6:
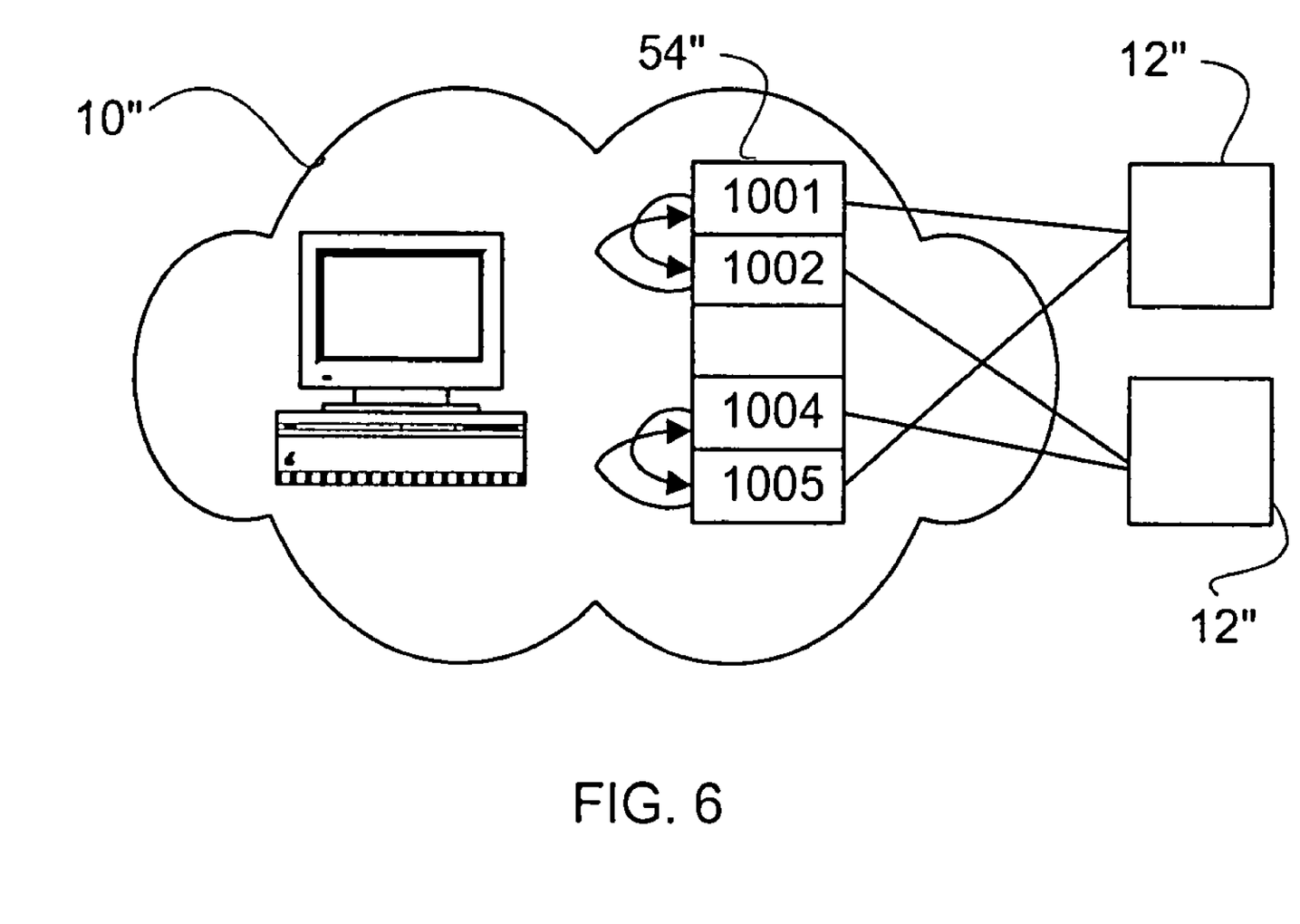
FIG. 6 is a schematic useful to illustrate an additional invention embodiment.

In an additional embodiment of the invention, the network interface that particular data streams are linked to is not a single port, but is instead a group of ports. FIG. 6 is a schematic useful to illustrate this embodiment. Because this represents an alternate configuration to that of FIG. 5, consistent element numbers will be used with a double-prime " designation. Referring now to FIG. 6, each attendee 12" is linked to a first interface that includes ports 1001 and 1002 within the bridge 54", and is linked to a second interface that includes ports 1003 and 1004 within the bridge 54".

Video data streams may be sent by each attendee 12" to the first interface, and audio to the second. That is, one attendee 12" sends video data streams to port 1001, and one attendee to port 1002. The stream received over port 1001 is sent out over 1002, and the stream received over 1002 is sent out over 1001. In this manner each attendee 12" connects to one port and receives all video data streams over that port. Likewise the audio streams received over port 1003 from one attendee 12" are sent to the second attendee 12" over the port 1004 that it is linked to. In this manner the two ports 1001 and 1002 collectively form an interface to which video data streams are linked, and ports 1003 and 1004 form a second interface to which audio data streams are linked.

Other invention embodiments may include additional steps related to tracking usage of the interfaces. For example, steps of recording linkage time or data communicated to each particular interface and for each particular attendee may be performed. One exemplary set of steps includes recording log-in and log-out time for each attendee at each interface. The interfaces can be made available at a per-unit time fee, with different interfaces having different fees. An attendee will incur a total fee that equals the total units of time connected to an interface multiplied by the per-unit fee for that interface. Another set of exemplary steps includes measuring the amount of data sent over each interface to each attendee. The data may be measured in units of bytes, bits, packets, or other useful units. A per-unit measure of data charge can be applied to the data consumed to bill users for their usage.

Steps of recording the usage for each interface and by each attendee can also be useful for a wide variety of purposes other than accounting. It will be appreciated that the information acquired through these steps can serve as a blueprint that shows what content for how long.

Methods of the invention may further include steps of assigning identifiers to the interfaces. Each of the virtual meetings may be assigned an identifier, such as a numeric code. Interfaces within each of the meetings may be assigned consistent identifiers. These steps may be illustrated by reference to FIG. 5 and Table 1. The first virtual meeting illustrated as meeting 50 has been assigned an identifier 0, and the second meeting illustrated as meeting 52 has been assigned an identifier 1. Interfaces linked to only video data streams have been assigned A, with only audio data streams B, with only application data streams C, and with only auxiliary data streams D. Because the exemplary application contemplated by Table 1 and FIG. 5 utilizes RTP protocol data streams, each interface includes a pair of ports assigned identifiers of 1 and 2. Port 1 corresponds to the control portion of the data stream, and port 2 to the data portion. In the exemplary application of FIG. 5 and Table 1, port numbers are assigned beginning at 1000, with the result that 1000 is added to the meeting identifier (e.g., meeting 1 becomes 1000, and meeting 2 1001).

These steps can be summarized as assigning an identifier of:

$$(1000+M)XY$$

to each interface, where:
 M is a meeting number (e.g., 0 or 1 for the two meetings of the example application)
 X is an identifier for the type of data stream linked to the interface (e.g., A for video only, B for audio only, C for application only, and D for auxiliary)
 Y is an identifier for RTP data stream portion (e.g., 1 for control portion, 2 for data portion).

By way of particular example, the port for the data portion of the video only streams from all of the conference rooms in the first virtual meeting will be assigned the identifier: 1000A2. This was derived as follows: 1000 (=1000+0), A (=video only), and 2 (=data portion). As a result, each interface or port has an identifier associated with it that carries inherent knowledge. That is, by examining a particular interface identifier, the data streams linked thereto can be identified, and vice versa. It will be appreciated that this provides substantial benefits, particularly in applications where tens, hundreds, or more virtual meetings are being conducted simultaneously, with each having a multiplicity of data streams. Under these circumstances, managing, organizing and accessing the large number of interfaces used can be a time consuming and difficult task. Methods of the invention substantially reduce the effort and time associated with these tasks.

Methods and program products of the invention may further include performing steps of data traffic management. For example, steps may be performed of setting a priority (IP Precedence or DSCP) of outgoing traffic streams based on the type of data stream assigned to a particular port. This allows for data streams to be re-classified when they are received from a source that does not classify traffic, or when the classification may have been reset during network transit. Other traffic management steps may include segregating data streams to different interfaces based on bandwidth. A particular range of ports, for example, may be classified as "high" bandwidth ports, and another as "low" bandwidth ports. Meeting attendees with limited bandwidth can select from the low bandwidth ports to link to with confidence that they can support link.

Other exemplary steps of data stream management are useful for interfacing between unicast and multicast formats. For example, exemplary steps include designating particular interfaces as unicast interfaces, and others as multicast interfaces. The exemplary steps further include receiving one or more unicast data streams, and making these available for multicast communication at the designated multicast interfaces. Similarly, multicast data streams received may be made available for unicast communication at the designated unicast interfaces. In this manner methods and program products of the invention allow for unicast clients to participate in an otherwise multicast based meeting, and vice-versa.

Still other exemplary steps of data stream management may be useful to control security aspects of the virtual meeting. For example, method steps of designating particular interfaces as "receive only" allow users to send traffic to the virtual meeting without receiving the group data stream traffic. Other steps include designating some interfaces as "secure," and linking sensitive data streams to these interfaces. A password or other verification may be required from a meeting attendee before he is allowed to link to this interface.

Those skilled in the art will appreciate that the exemplary embodiments described and discussed herein have been selected as being exemplary only, and that the invention is not limited to these examples. For example, although examples have been illustrated with particular numbers of meeting attendees and data streams, it will be appreciated that the method of the invention may be practiced on any practical scale. Invention methods and program products may be practiced, for example, with virtual meetings that include tens, hundreds, or more conference rooms and/or attendees, and with real time data streams that far outnumber the one illustrated herein. Indeed, the method may be practiced with any number n of streams and interfaces, where n is a positive integer. Also, it will be appreciated that although exemplary method and program products have been illustrated in a particular sequence of steps, the sequence is not necessarily important to the invention and could easily be altered. Computer program embodiments of the invention are also not limited to a single computer, but may be practiced by a plurality of computers.

What is claimed is:

1. A method for communicating real time data streams between a plurality of virtual meeting attendees over a digital data network comprising the steps of:
 receiving a plurality of real time data streams that include a first and a second real time data stream communicated from at least one attendee computer at each of a plurality of virtual meeting attendees, each of said plurality of real time data streams encoded in a packet based protocol that includes a discrete control portion and a discrete data portion;
 linking said first real time data stream from each of the plurality of virtual attendees to a first network interface that is separate from said at least one attendee computers, said first network interface includes a first port linked to said first real time data stream data portion to and a second port linked to said first real time data stream control portion;
 linking said second real time data stream from each of said plurality of virtual meeting attendees to a second network interface that is separate from said at least one attendee computers, said second interface including a first port linked to said second real time data stream data portion and a second port linked to said second real time data stream control portion wherein said data and control portions are communicated through different ports; and,
 allowing a requestor to selectively link to one but not the other of said first and said network interfaces.

2. A method as defined by claim 1 and further including the steps of recording the usage of said requestor.

3. A method as defined by claim 2 wherein the step of recording said usage includes recording the amount of time that said requestor selectively links to said one but not said other of said first and said second interfaces, and of recording the time said requestor disconnects from said one network interface.

4. A method as defined by claim 2 wherein the step of recording said usage includes recording the amount of data consumed by said requestor.

5. A method as defined by claim 1 wherein said first real time data stream is audio data and said second real time data stream is video data.

6. A method as defined by claim 1 wherein said plurality of real time data streams further includes a third real time data stream, and further including the step of linking said third real time data stream from each of said plurality of virtual meeting attendees to a third network interface.

7. A method as defined by claim 6 wherein said plurality of real time data streams includes a total of n streams, and further including the step of linking each of said n streams from each of said virtual meeting attendees to one of n network interfaces, where n is any positive integer.

8. A method as defined by claim 7 wherein said first real time data stream from said n streams is video data, wherein said second real time data stream from said n streams is audio data, wherein said third real time data stream from said n streams is application data, and wherein a fourth real time data stream from said n streams is auxiliary data.

9. A method as defined by claim 1 wherein said first and second network interfaces are within a bridge.

10. A method as defined by claim 1 wherein said first and second interfaces are each one port.

11. A method as defined by claim 1 wherein said first and second interfaces are each a plurality of ports.

12. A method as defined by claim 1 and further including the preliminary step of querying each of said plurality of virtual meeting attendees to identify said first and second real time data streams.

13. A method as defined by claim 1 wherein said plurality of virtual meeting attendees are a first plurality of virtual meeting first attendees at a first virtual meeting, and wherein the method further includes the steps of:
receiving a second plurality of real time data streams from each of a plurality of second attendees of a second virtual meeting, said second virtual meeting different from said first virtual meeting wherein said first attendees from said first virtual meeting are not in communication with said second attendees from said second virtual meeting, said second plurality of real time data streams from each of said plurality of second virtual meeting second attendees including a first and a second real time data stream;
linking only said first real time data stream from each of said plurality of second virtual meeting second attendees to a third network interface; and,
linking only said second real time data stream from each of said plurality of second virtual meeting second attendees to a fourth network interface.

14. A method as defined by claim 13 wherein said first real time data streams from each of said first plurality of first virtual meeting attendees and said first real time data streams from each of said plurality of second virtual meeting second attendees are video data streams, and wherein said second real time data streams from each of said first plurality of first virtual meeting first attendees and said second real time data streams from each of said plurality of second virtual meeting second attendees are audio data streams.

15. A method as defined by claim 1 wherein said plurality of virtual meeting attendees are physically present in a plurality of conference rooms, and wherein at least a portion of said conference rooms have a plurality of cameras for communicating a plurality of real time video streams.

16. A method as defined by claim 1 and further including the step of designating at least one of said first and second network interfaces as a high bandwidth interface, and of connecting the highest bandwidth data stream from said plurality of real time data streams to said high bandwidth interface.

17. A method as defined by claim 1 wherein at least one of said first and second network interfaces is an interface between unicast and multicast communications.

18. A computer program product for linking data communications between a plurality of users in each of a plurality of virtual meetings on a data network, the program product comprising computer executable instructions stored on a computer readable medium that when executed cause one or more computers to:
receive a first plurality of real time data streams from each of a plurality of attendees at a first meeting, said plurality of real time data streams including at least one real time video data stream and at least one real time audio data stream from each of said plurality of first meeting attendees;
receive a second plurality of real time data streams from each of a plurality attendees at a second meeting, said second virtual meeting occurring at least partially concurrently with said first virtual meeting, said second plurality of real time data streams including at least one real time video data stream and at least one real time audio data stream from each of said second virtual meeting attendees;
link only said real time video data streams from said plurality of first meeting attendees to a first network interface and linking only said real time audio data streams from said plurality of first meeting attendees to a second network interface;
link only said real time video data streams from said plurality of second meeting attendees to a third network interface and linking only said real time audio data streams from said plurality of second meeting attendees to a fourth network interface;
allow a requestor to selectively choose which of said interfaces to receive data streams from whereby said requestor may choose to receive data streams from only one of said first, second, third or fourth interfaces; and,
assign identifiers to each of said network interfaces, said identifier for said first network interface including A and X, said identifier for said network second interface including A and Y, said identifier for said third network interface including B and X, and said identifier for said fourth network interface including B and Y, where A is an identifier for said first virtual meeting, B is an identifier for said second virtual meeting, X is an identifier for an interface having only video data, and Y is an identifier for an interface having only audio data.

19. A computer program product as defined by claim 18 wherein the program instructions further cause the one or more computers to assign an identifier to each of said first, second, third and fourth interfaces, said identifier having inherent knowledge that describes the content of the data streams linked thereto.

* * * * *